(12) United States Patent
Edvardsson

(10) Patent No.: US 7,106,247 B2
(45) Date of Patent: Sep. 12, 2006

(54) RADAR LEVEL GAUGE WITH ANTENNA ARRANGEMENT FOR IMPROVED RADAR LEVEL GAUGING

(75) Inventor: Kurt Olov Edvardsson, Linköping (SE)

(73) Assignee: SAAB Rosemount Tank Radar AB, Gothenburg (SE)

( * ) Notice: Subject to any disclaimer, the term of this patent is extended or adjusted under 35 U.S.C. 154(b) by 0 days.

(21) Appl. No.: 10/687,925

(22) Filed: Oct. 20, 2003

(65) Prior Publication Data

US 2005/0083228 A1    Apr. 21, 2005

(51) Int. Cl.
*G01F 23/284* (2006.01)
*G01S 13/08* (2006.01)

(52) U.S. Cl. .................. 342/124; 342/118; 342/175; 342/188; 342/195; 73/290 R; 702/155; 702/158; 702/159

(58) Field of Classification Search ............... 342/118, 342/124, 127–133, 145, 175, 188–197; 324/629, 324/631, 637–646; 73/149, 290 R, 304 R, 73/304 C, 290 B; 702/155, 156, 158, 159, 702/166
See application file for complete search history.

(56) References Cited

U.S. PATENT DOCUMENTS

| 5,136,299 | A | * | 8/1992 | Edvardsson | 342/124 |
| 5,543,720 | A | * | 8/1996 | Edvardsson | 324/643 |
| 5,629,706 | A | * | 5/1997 | Baath | 342/124 |
| 6,759,976 | B1 | * | 7/2004 | Edvardsson | 342/124 |
| 2002/0124644 | A1 | | 9/2002 | Lubbers | |

OTHER PUBLICATIONS

"International Search Report" for PCT/SE2004/001495.

* cited by examiner

*Primary Examiner*—Bernarr E. Gregory
(74) *Attorney, Agent, or Firm*—Westman, Champlin & Kelly, P.A.

(57) ABSTRACT

The present invention relates to a radar level gauge (1) comprising an antenna (2), a tank sealing (3), an electronics unit (4) and a waveguide feed (5) between the electronics unit (4) and the antenna (2). The waveguide (5) is essentially straight and has a 90°-symmetric cross section and is further arranged to accommodate two essentially orthogonal waveguide modes. The waveguide (5) further has a length (I) below two times the range resolution of said radar level gauge (1). The present invention further relates to a method for improved radar level gauging using a radar level gauge (1) as above.

19 Claims, 3 Drawing Sheets

RADAR LEVEL GAUGE WITH ANTENNA ARRANGEMENT FOR IMPROVED RADAR LEVEL GAUGING

FIELD OF THE INVENTION

The present patent application relates to a radar level gauge with antenna arrangement for improved radar level gauging. The present patent application further relates to a method for improved radar level gauging using such a radar level gauge. The invention provides improved gauging sensitivity at small distances and any disturbances of a weak surface echo by any internal echoes will be minimized.

BACKGROUND OF THE INVENTION

Radar level gauging in all kinds of tanks has found a steadily increasing use since the mid-seventies. The extension of the use to more diversified applications has posed a number of challenges on the design of radar level gauges.

Obvious basic functions for all radar level gauges are sealing of the tank, which may hold high pressure, dangerous contents etc., and sealing of the enclosure protecting the electronics of the radar level gauge, at least for outdoor environments applications and sometimes for open sea applications etc. The enclosure for the electronics is many times also determined by regulations for explosion protection related to electric equipment. This is all standard technology but a characteristic need for radar level gauges is an electrical (microwave) connection from the radar electronics to the antenna.

Coaxial connections and waveguides are used presently for this microwave connection. At least one microwave joint is usually provided in this microwave connection, for instance to be able to replace a faulty electronic unit while the tank is pressurized. The microwave joint is a critical part during field replacements.

Coaxial connectors are manufactured as standard items including sealed parts etc. and thus frequently used in radar level gauges. Field experience however is that the tiny connectors, which are necessary for high frequency use, may easily be damaged during handling outside of laboratory environments and that they will degrade severely if even a very small amount of water, a 0.1 mm layer or less, or dirt is trapped inside at handling during certain weather conditions. Waveguides are also frequently used and are much more robust but have to be well integrated in the mechanics in order to provide a cost efficient solution. Due to the larger dimensions of the waveguide the requirement for good electrical connection is less pronounced and local water droplets etc. can be tolerated. Normal waveguide impedance is a few 100 ohms instead of the 50 ohm impedance in a coaxial cable indicating much less current densities for the same transported power.

Sensitivity is a very critical property in applications where small antennas have to be used and where the low reflection of a turbulent surface of a low-epsilon liquid have to be taken care of. In a typical radar level gauge in a quiet refinery tank or corresponding tank on a ship in harbor, the two way attenuation for the radar signal may be 40 to 50 dB, while a typical process tank with a 2"–3" antenna, turbulent surface etc. will exhibit a corresponding attenuation of 70 to 80 dB or more. Further, a coaxial cable for a 25 GHz radar will introduce a loss off several dB in a typical radar level gauge application, when used as a connection from the electronics to the antenna.

Furthermore all radar systems need some duplexing function to use the same physical antenna for transmitting and receiving and typically that introduces two-way losses of 6–10 dB or more with the simple system used in most radar level gauges. Power splitter or hybrid junction are examples of such systems both giving at least 3 dB in each direction. Two separate antennas would save these 6–10 dB but a more practical way is to use two antenna functions inside the same antenna mechanics. In that case right-hand circular polarization (RHCP) and left-hand circular polarization (LHCP) are sometimes used to form two independent antenna functions connected by separate lines to the microwave transmitter/receiver unit. A rotational symmetric horn antenna is one example of a physical antenna where these two electrically independent antenna functions LHCP/RHCP are easily housed.

Said RHCP/LHCP arrangement is also very useful for handling reflections to flat walls in the tank. Such reflections, both towards the surface and towards the walls, are known to change the circular polarization of the radar wave from RHCP to LHCP or the other way around, and by sending for instance RHCP and receiving LHCP only waves reflected an odd number of times (1, 3 etc.) will be received without extra attenuation. For many kinds of echoes, but especially for disturbing reflections in a flat wall within the antenna beam, this is known to be an efficient method to make the echo more clean and thus increase accuracy for a radar level gauge. In a big tank (used in refineries etc.), with mounting holes for big antennas available, a narrow antenna beam can be used (based on big antenna diameter) limiting the number of false reflections in tank structures but in a small tank, typical for many applications in the process industry, a wider antenna beam is necessary (due to small mounting holes for antennas) which combined with the more compact geometry will give a larger number of false reflections in tank structures.

In small tank applications there will always be internal reflections or bouncing back and fourth between the antenna and the microwave unit and such reflections will create a number of false echoes seemingly below the antenna but entirely created internally. Obviously such echoes are weak but nevertheless important at weak surface reflections due to turbulence, foam etc. or due to a dirty antenna surface.

One radar level gauge including the RHCP/LHCP-method is described in U.S. Pat. No. 5,543,720. The practical solution there is complex in order to cover a wide range of applications. The complex mechanics involved also indicates a far too high cost for the typical process use. Also, this arrangement is intended for use in connection with large storage tanks and not suited for measurements in smaller size tanks, such as process tanks, which usually are of substantially smaller physical dimensions.

SUMMARY OF THE INVENTION

One object of the invention is to provide an improved radar level gauge.

A further object of the present invention is to provide a radar level gauge having improved gauging sensitivity at small distances and minimizing any disturbances of a weak surface echo by any internal echoes.

A still further object of the present invention is to provide a radar level gauge which enables an enclosed electronics unit to be detached from and attached to an associated antenna whilst providing maintained sealing of an associated tank.

Another object of the present invention is to provide a radar level gauge minimizing losses in the power budget.

Yet another object of the present invention is to provide a radar level gauge having minimized internal signal lengths.

A still additional object of the present invention is to provide a radar level gauge providing a simple and effective sealing of an associated tank.

Briefly, a radar level gauge having a defined range resolution in accordance with a first embodiment of the present invention comprises an antenna, a tank sealing, an enclosed electronics unit and a waveguide feed between the electronics unit and the antenna, said waveguide is essentially straight and has a 90°-symmetric cross section and is arranged to accommodate two essentially orthogonal waveguide modes, said waveguide further having a length below two times said range resolution of said radar level gauge, whereby said radar level gauge exhibits improved sensitivity at small distances and any disturbances of a weak surface echo by any internal echoes will be minimized.

A further object of the present invention is to provide an improved method for improved radar level gauging using a radar level gauge comprising an antenna, a tank sealing, an enclosed electronics unit and a waveguide feed between the electronics unit and the antenna.

Briefly, a first embodiment of a method for detection of a separation frequency in a radar level gauge having a defined range resolution comprises the steps of: providing as said waveguide feed an essentially straight waveguide having a 90°-symmetric cross section; and arranging said waveguide to accommodate two essentially orthogonal waveguide modes; and giving said waveguide a length below two times said range resolution of said radar level gauge, whereby the method will provide improved sensitivity when gauging small distances and any disturbances of a weak surface echo by any internal echoes will be minimized.

An advantage of the radar level gauge and method in accordance with the present invention compared to prior art arrangements and methods is that an improved ability to distinguish between short range surface echoes and any disturbances by internal echoes is provided.

A further advantage of the radar level gauge and method in accordance with the present invention is that the ability to replace a faulty electronic unit while an associated tank is pressurized is enabled.

Further advantages and benefits of the present invention will become apparent from the following detailed description considered in conjunction with the accompanying drawings.

BRIEF DESCRIPTION OF THE DRAWINGS

In the following, the invention will be described in greater detail with reference to attached drawings, in which.

Still other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF ILLUSTRATIVE EMBODIMENTS

Figure 1:
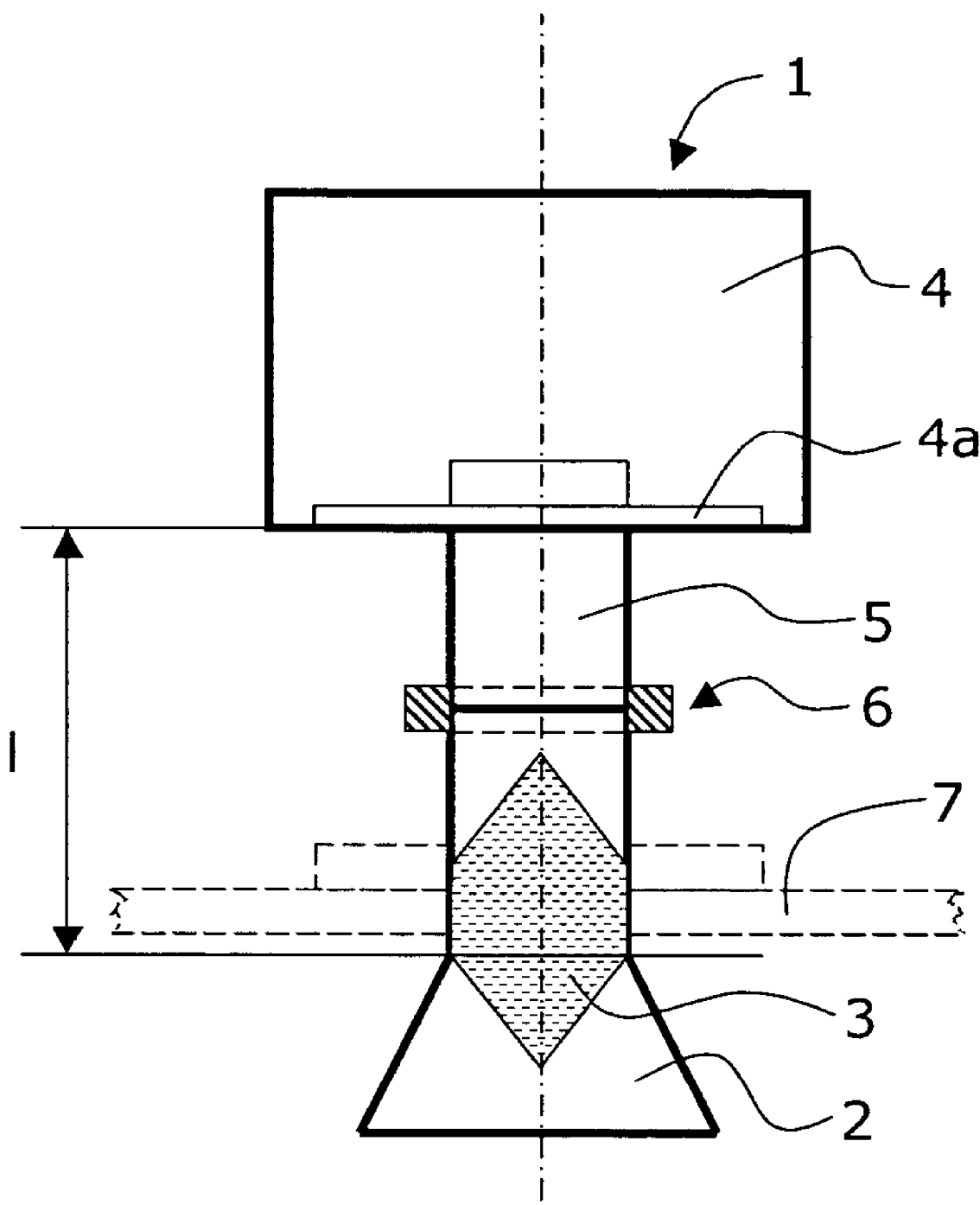
FIG. 1 illustrates schematically a radar level gauge with an antenna arrangement for improved radar level gauging in accordance with the present invention.

A radar level gauge 1 with an antenna arrangement for improved radar level gauging in accordance with the present invention and as illustrated in FIG. 1 comprises: an antenna 2, a tank sealing 3, an enclosed electronics unit 4 and a waveguide feed 5 between the electronics unit 4 and the antenna 2. The waveguide 5 is essentially straight and has a 90°-symmetric cross section and is arranged to accommodate two essentially orthogonal waveguide modes. Further, the waveguide 5 has a physical length below two times the range resolution or preferably below one range resolution. The physical length is counted from the microwave/electronic circuits (the circuit board) to the upper end of the antenna 2 and is thus representative for the length when a small antenna 2 is used, typical in cases when this internal distance is critical as will be discussed further down. For a definition of "range resolution" reference can for instance be made to pages 358–359 of "Radar Principles" by Peyton Z. Peebles, Jr., ISBN 0-471-25205-0, which is hereby incorporated by reference in its entirety. With an ideal rectangular pulse shape this range resolution is $c\tau/2$ (c=velocity of light and $\tau$ pulse time). For pulsed radar level gauges 1 ns is a typical pulse time with the ideal rectangular pulse shape corresponding to 150 mm or in the practical case slightly more based on the general definition in the reference given. Many radar level gauges use the FMCW method where the bandwidth is the important parameter and the inverted bandwidth B corresponds to the time $\tau$. For instance 1000 MHz is common sweep bandwidth in a FMCW radar level gauge giving the same theoretical range resolution as a pulsed system using 1 ns pulses.

The waveguide transmission 5 is used to get a more robust connection than traditional coaxial connections. In order to enable safe field removal of the electronics in its enclosure in one embodiment the waveguide feed 5 is many times provided with a waveguide joint 6 enabling the enclosed electronics unit 4 to be detached from and attached to said antenna 2 with said tank sealing 3 providing maintained sealing of the tank 7 (a part of which is shown in dashed lines in FIG. 1). In order to reduce the transmission losses between the electronics 4 and the antenna 2 an essentially straight waveguide 5 is used, as a straight waveguide usually has losses counted in tenths of a dB, which is an order of dignity less than the typical loss in a coaxial cable used to connect the antenna in a radar level gauge.

Figure 2:
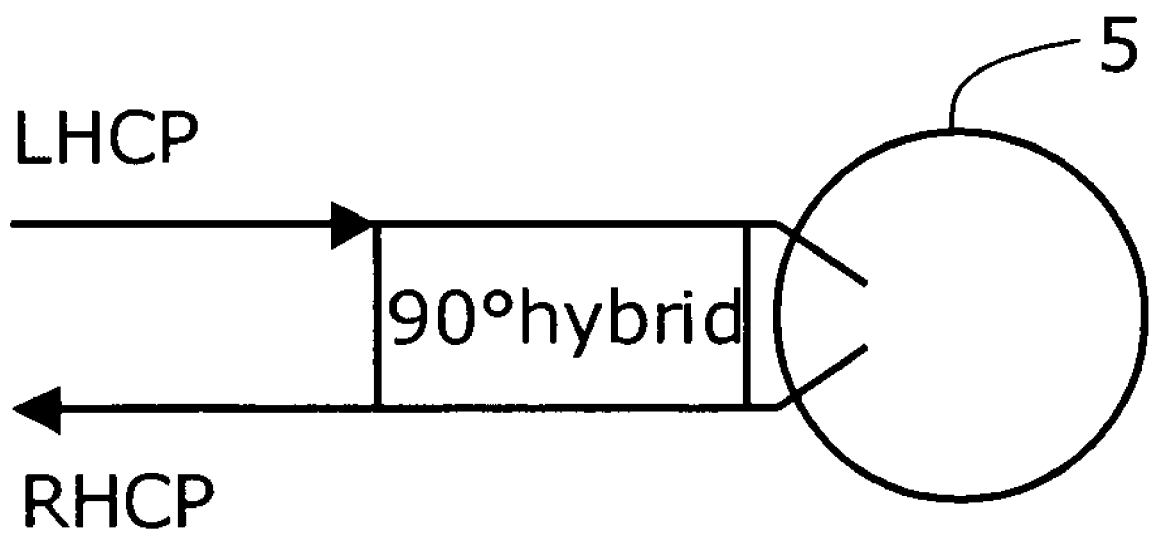
FIG. 2 illustrates schematically an example feed of a circular waveguide.

A two-mode waveguide connection is used to save losses in the power budget. The preferred solution is to use a waveguide 5 having a cross section with a 90°-symmetry, with circular and quadratic as two examples, and to use two essentially orthogonal waveguide modes such as left-hand circular polarization (LHCP) and right-hand circular polarization (RHCP) going all the way from the electronic circuits to the antenna. FIG. 2 illustrates schematically an example feed of a circular waveguide.

The special property of circular polarization is used to suppress echoes reflected an even number of times, which will provide improved signal quality by favoring the surface echo. This will also give a certain advantage for the surface echo in relation to most other disturbing echoes.

For application in small tanks the internal microwave length in the gauge 1 is important. There will always be internal reflections or bouncing back and fourth between the antenna 2 and the microwave unit 4 and such reflections will create a number of false echoes seemingly below the antenna 2. Obviously such echoes are weak but nevertheless important at weak surface reflections due to turbulence, foam etc. or due to a dirty antenna surface.

In order to make such internal reflections weak the physical length between the antenna 2 and electronics 4 is minimized as this will move the disturbing echoes closer to the antenna 2 where the strength of the echoes is stronger. The natural measure for "close to the antenna" is subsequently called "range resolution" and is the path a radar wave goes there and back during the pulse length, which for a frequency modulated system (FMCW etc.) equals the path the radar wave goes during the time corresponding to the inverted bandwidth. A typical bandwidth for a FMCW system is 1000 MHz (=1 ns inverted). In both these cases the range resolution is 0.15 m, which is a measure on the practical resolution obtainable with the system in question. With practical degradations the practical system resolution can be expected to be around two times said "range resolution".

Figure 3:
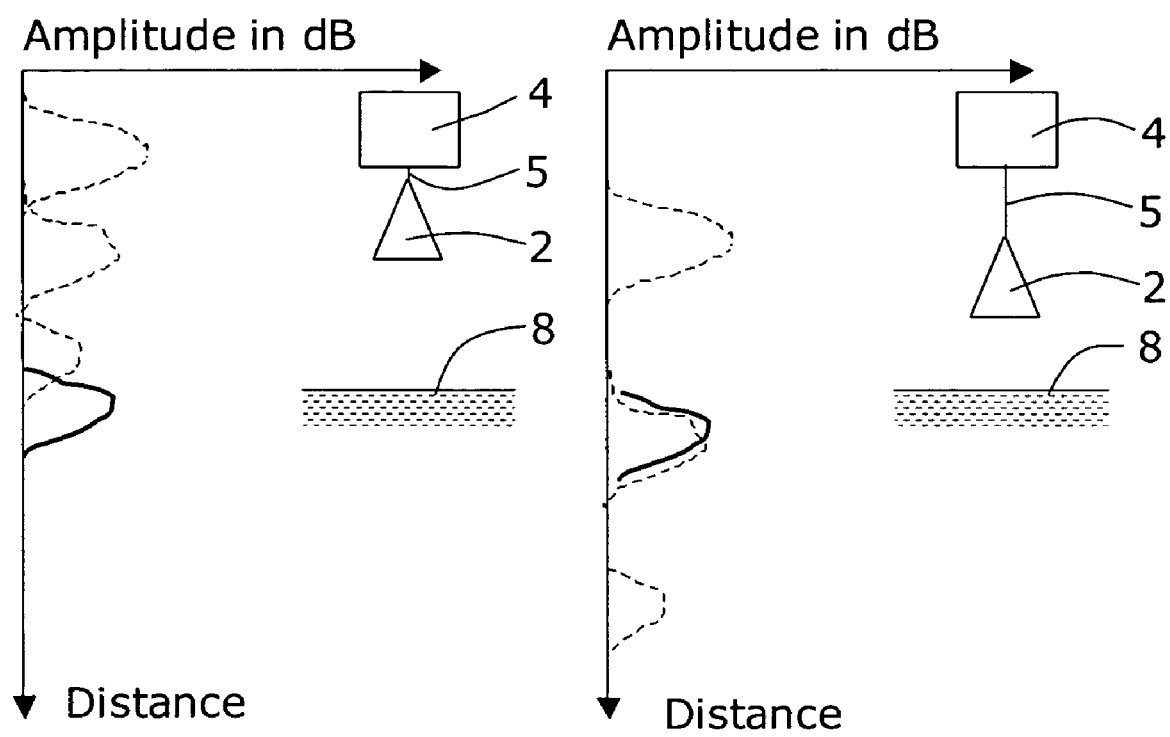
FIG. 3 illustrates schematically internal echo patterns, to the left for the radar level gauge according to FIG. 1 and to the right an example of prior art echo patterns.

The significance of this internal distance is illustrated by two examples in FIG. 3, where two radar level gauges 1, which are identical except for the length of the waveguide 5 are compared. Due to practical limitations it is inevitable to have microwave reflections between the waveguide 5 and the electronic circuit 4 and between the waveguide 5 and the antenna 2. Towards the antenna 2 such reflections are increased by antenna contaminations (splashing liquid, condensation etc.) and thus not under full control. The use of a waveguide 5 usually makes these internal reflections lower than if a coaxial line is used. These reflections will in case of a pulsed system create a pulse train of bouncing pulsed with a rapidly decreasing amplitude instead of the ideal case with one single transmitted pulse only. The rate of decay can be very different but may be 15–25 dB per pulse. For a good echo situation only the first (intended) pulse is significant but 2–3 pulses are many times measurable. In case of a poor echo situation (foam or turbulent surface etc) and a system with high sensitivity however these multiple bouncing internal echoes will limit the sensitivity at small distances and the weak surface echo will be disturbed by the internal echoes. Safe and accurate measurement when the tank 7 is on its way to be full is extremely important for the user as otherwise a dangerous overfill situation might occur. Thus an important goal for the radar level gauge design in accordance with the present invention is to limit the influence of such internal echoes and as is illustrated in FIG. 3 a short internal length "l" (a short waveguide 5) is a very important way together with a low reflection level which however may be degraded by dirt on the antenna 2 etc.

In FIG. 3 the internal pulses are indicated by dashed pulse shapes and in the unit to the left (according to the present invention) the minimized internal distances makes the multiple pulses decay much more close to the antenna 2 while the bigger internal distances according to the right hand figure (example of prior art) stretches the internal echo pattern so it will disturb the surface 8 echo shown as a solid line.

The essentially straight waveguide 5 in combination with a microwave module where the same Printed Circuit Board (PCB) 4*a* is used for a waveguide feed, an arrangement for obtaining the two essentially orthogonal waveguide modes (for instance by the method indicated in FIG. 2) and microwave transmitter and receiver circuits is an efficient way to minimize the internal length. A length below two times the range resolution for the shortest antenna is considered as sufficient to utilize the invention with improved performance for a shorter length such as one range resolution. Functionally the overall length, including the electronic/microwave circuits the waveguide and the antenna, should be considered but the length on the printed circuit board 4*a* can be minimized by known methods. The antenna 2 should be small in cases where the performance very close to the antenna 2 is important and the upper portion of the antenna 2 is the most likely position for antenna reflections. Thus the length "l" of the waveguide 5 including sealings and other practical details is a most significant part of the overall length.

The radar unit 1 includes a transmitter (TX) and a receiver (RX) and the radar system can be of any type such as Frequency Modulated Continuous Wave (FMCW), pulsed etc. In terms of practical implementation TX and RX are in practically all commercial radar level gauges located in the same circuit (on the same PCB). On the PCB the TX/RX-module has two connections but most low-cost radar systems use a common antenna where the two connections are merged inside the TX/RX-module by some kind of lossy power divider or directional coupler giving a two-way loss of at least 2×3 dB or more realistic 7–12 dB. For radar level gauging a known way to reduce the this unnecessary loss is to use circular polarization, which is a way to give the antenna two ports to match the natural ports of the TX/RX-module and save most of the 7–12 dB loss. 12 dB less loss would for instance increase the sensitivity limited range 4 times so the difference in sensitivity can have a very obvious practical influence. The method of having two orthogonal polarizations (in the simplest case LHCP/RHCP but any pair of orthogonal elliptical polarizations would do the same) not only will increase the sensitivity but also suppress some disturbing echoes, among them those from a tank wall close to the antenna beam.

In one embodiment a circular cross section waveguide 5 is used as antenna connection and the LHCP and RHCP signals in said waveguide 5 are formed by feeding the waveguide 5 by two 90° separated probes (generally referred to as OMT=Ortho Mode Transducer) fed by a 90° hybrid coupler giving one port for RHCP and one port for LHCP as illustrated schematically in FIG. 2. In a radar level gauge application this rather conventional RHCP/LHCP generation has four advantages:

1) The concentration of the LHCP/RHCP-generation to a single PCB 4*a* enables better performance (insulation and matching) than known prior art solutions as a possibly increased pattern complexity can be done accurately but still without extra cost per unit.

2) The collection of all critical microwave functions (TX, RX and LHCP/RHCP-generation) to one PCB 4*a* is a cost effective solution.

3) The circular waveguide 5 straight from the OMT to the horn antenna 2 is a mechanically simple solution where the joint 6 as well as one or more sealing elements can be included with mechanically straightforward solutions.

4) The PCB 4*a* solution in combination with the simple waveguide chain 5 enables a very short microwave path from the TX/RX-module to the antenna 2, which is an important property for good measuring performance at small distances.

Instead of the circular cross section waveguide any waveguide 5 having 90°-symmetry of its cross section can be used. For instance a square or super elliptic cross section shape may be used, which should increase the waveguide bandwidth and be a bit more space efficient. As the metal parts of such waveguides are made by casting or moulding such cross sections are feasible but possibly less easy to seal.

In most cases the antenna 2 is a cone forming a kind of termination of the typically straight waveguide 5 and the cone can be one of many options. Different lengths and diameters are needed for optimizing the function for different tank mounting hole sizes, different tank depths etc. Different materials are needed, for instance in extremely corrosive environment, and some cones can be made slightly bell shaped to make them shorter for the same diameter. The diameter is the most important measure for the electrical function. Having a large diameter, as compared to the used wavelength, will give the antenna 2 high gain properties, which are good for long range measurement, and also provide a narrow antenna beam, which will help to suppress disturbing echoes. In some applications a waveguide extension might be necessary to obtain insulation from extreme temperatures in the tank. In connection with applications needing very low near-zone internal echoes a short antenna 2 is chosen, so this case is decisive for the short internal length discussed above.

In one embodiment of the present invention the antenna 2 and the tank sealing 3 comprises a horn antenna 2 having a 90°-symmetric cross section which is sealed by a dielectric material 3 filling at least part thereof along the waveguide 5.

A method for improved radar level gauging using a radar level gauge 1 comprising an antenna 2, a tank sealing 3, an enclosed electronics unit 4, a waveguide feed 5 between the electronics unit 4 and the antenna 2, comprises the steps of: providing as said waveguide feed 5 an essentially straight waveguide 5 having a 90°-symmetric cross section; arranging said waveguide 5 to accommodate two essentially orthogonal waveguide modes; giving said waveguide 5 a length below two times the range resolution of said radar level gauge 1.

In a further embodiment the method further comprises the steps of; providing said waveguide feed 5 with a waveguide joint 6 enabling said enclosed electronics unit 4 to be detached from and attached to said antenna 2 with said tank sealing 3 providing maintained sealing of the tank.

In a yet further embodiment the method further comprises the step of; arranging said waveguide 5 to accommodate as said two essentially orthogonal waveguide modes LHCP (Left Hand Circular Polarization) and RHCP (Right Hand Circular Polarization).

In a still further embodiment the method further comprises the steps of; arranging a waveguide feed, an arrangement for obtaining said two essentially orthogonal waveguide modes and microwave transmitter and receiver circuits on the same Printed Circuit Board 4a of said electronics unit 4.

In yet a still further embodiment the method further comprises the steps of; providing as said antenna 2 a horn antenna having a 90°-symmetric cross section; and providing as said tank sealing 3 a dielectric material filling at least part of said horn antenna 2 along said waveguide 5.

The present invention further relates to a radar level gauging system comprising at least one radar level gauge as described above.

The invention is not limited to the above-described embodiments, but may be varied within the scope of the following claims.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A radar level gauge having a defined range resolution comprising:
    an antenna, an electronics unit, a waveguide feed between the electronics unit and the antenna;
    wherein said waveguide is essentially straight and has a 90°-symmetric cross section and is arranged to accommodate two essentially orthogonal waveguide modes; said waveguide further having a length below two times said range resolution of said radar level gauge.

2. The radar level gauge (1) of claim 1,
    further comprising a tank sealing,
    wherein said waveguide feed is provided with a waveguide joint enabling said electronics unit to be detached from and attached to said antenna with said tank sealing providing maintained sealing.

3. The radar level gauge (1) of claim 2,
    wherein said two essentially orthogonal waveguide modes are LHCP (Left Hand Circular Polarization) and RHCP (Right Hand Circular Polarization).

4. The radar level gauge (1) of claim 3,
    wherein a waveguide feed, an arrangement for obtaining said two essentially orthogonal waveguide modes and microwave transmitter and receiver circuits are arranged on the same Printed Circuit Board of said electronics unit.

5. The radar level gauge (1) of claim 2,
    wherein a waveguide feed, an arrangement for obtaining said two essentially orthogonal waveguide modes and microwave transmitter and receiver circuits are arranged on the same Printed Circuit Board of said electronics unit.

6. The radar level gauge (1) of claim 1,
    wherein said two essentially orthogonal waveguide modes are LHCP (Left Hand Circular Polarization) and RHCP (Right Hand Circular Polarization).

7. The radar level gauge (1) of claim 6,
    wherein a waveguide feed, an arrangement for obtaining said two essentially orthogonal waveguide modes and microwave transmitter and receiver circuits are arranged on the same Printed Circuit Board of said electronics unit.

8. The radar level gauge (1) of claim 1,
    wherein a waveguide feed, an arrangement for obtaining said two essentially orthogonal waveguide modes and microwave transmitter and receiver circuits are arranged on the same Printed Circuit Board of said electronics unit.

9. The radar level gauge (1) of any one of claims 1 to 4, wherein said antenna and said tank sealing comprises a horn antenna having a 90°-symmetric cross section which is sealed by a dielectric material filling at least part thereof along said waveguide.

10. A method for improved radar level gauging using a radar level gauge having a defined range resolution, said radar level gauge comprising an antenna, an electronics unit, a waveguide feed between the electronics unit and the antenna, the method comprising the steps of:
providing as said waveguide feed an essentially straight waveguide having a 90°-symmetric cross section;
arranging said waveguide to accommodate two essentially orthogonal waveguide modes;
giving said waveguide a length below two times said range resolution of said radar level gauge.

11. The method of claim 10, further comprising the steps of;
providing a tank sealing, and
providing said waveguide feed with a waveguide joint enabling said electronics unit to be detached from and attached to said antenna with said tank sealing providing maintained sealing.

12. The method of claim 11, further comprising the step of;
arranging said waveguide to accommodate as said two essentially orthogonal waveguide modes LHCP (Left Hand Circular Polarization) and RHCP (Right Hand Circular Polarization).

13. The method of claim 12, further comprising the steps of;
arranging a waveguide feed, an arrangement for obtaining said two essentially orthogonal waveguide modes and microwave transmitter and receiver circuits on the same Printed Circuit Board of said electronics unit.

14. The method of claim 11, further comprising the steps of;
arranging a waveguide feed, an arrangement for obtaining said two essentially orthogonal waveguide modes and microwave transmitter and receiver circuits on the same Printed Circuit Board of said electronics unit.

15. The method of claim 10, further comprising the step of;
arranging said waveguide to accommodate as said two essentially orthogonal waveguide modes LHCP (Left Hand Circular Polarization) and RHCP (Right Hand Circular Polarization).

16. The method of claim 15, further comprising the steps of;
arranging a waveguide feed, an arrangement for obtaining said two essentially orthogonal waveguide modes and microwave transmitter and receiver circuits on the same Printed Circuit Board of said electronics unit.

17. The method of claim 10, further comprising the steps of;
arranging a waveguide feed, an arrangement for obtaining said two essentially orthogonal waveguide modes and microwave transmitter and receiver circuits on the same Printed Circuit Board of said electronics unit.

18. The method of any one of claims 10 to 13, further comprising the steps of;
providing as said antenna a horn antenna having a 90°-symmetric cross section;
providing as and said tank sealing a dielectric material filling at least part of said horn antenna along said waveguide.

19. A radar level gauging system, comprising at least one radar level gauge according to any one of claims 1 to 9.

* * * * *